375-58 SR
5/6/86 OP 000,062

United States Statutory Invention Registration [19]

[11] Reg. Number: H62
[45] Published: May 6, 1986

Sanderson

[54] CLOSED LOOP BINARY DIGITAL COMMUNICATION SYSTEM

[75] Inventor: Barry D. Sanderson, Indianapolis, Ind.

[73] Assignee: The United States of America as represented by the Secretary of the Navy, Washington, D.C.

[21] Appl. No.: 614,196

[22] Filed: May 25, 1984

[51] Int. Cl.[4] ..... H04B 15/00; H04B 1/10
[52] U.S. Cl. ..... 375/58; 375/99; 371/32
[58] Field of Search ..... 375/58, 99, 107, 108, 375/109; 371/32, 33, 34; 455/69; 370/32

[56] References Cited

U.S. PATENT DOCUMENTS

| | | | |
|---|---|---|---|
| 3,022,493 | 2/1962 | Tschumi et al. | 340/825.48 |
| 3,402,389 | 9/1968 | Koontz | 375/109 |
| 3,605,091 | 9/1969 | Tong | 371/34 |
| 3,805,234 | 4/1974 | Masters | 371/34 |
| 3,899,637 | 8/1975 | Willard et al. | 375/9 |
| 3,919,650 | 11/1975 | Fretwell | 329/102 |
| 3,934,224 | 1/1976 | Dulaney et al. | 371/34 |
| 4,149,030 | 4/1979 | Foreman | 375/9 |
| 4,280,222 | 7/1981 | Flower | 375/38 |
| 4,342,986 | 8/1982 | Buskirk et al. | 340/539 |

*Primary Examiner*—Stephen C. Buczinski
*Assistant Examiner*—Linda J. Wallace
*Attorney, Agent, or Firm*—Robert F. Beers; Harvey A. David

[57] ABSTRACT

A closed loop system for communication of binary data utilizes master or data sources and slave or data sink stations, each including a transmit buffer, a three-state transmitter, a receiver, a comparator, a three-state receiver, a receive buffer, a timer, a filter and a local controller, with the transmitter of each station connected by a transmission path to the receiver of the other station. Binary data bits are separated by spaces and bits and spaces are transmitted singly from the source station, received and retransmitted back to the source station by the sink station, with each retransmitted bit or space being compared at the source station with its original transmission for verification before a succeeding bit or space is transmitted.

2 Claims, 2 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

CLOSED LOOP BINARY DIGITAL COMMUNICATION SYSTEM

BACKGROUND OF THE INVENTION

This invention relates to the field of digital data communication and more particularly to a system or apparatus for rendering such communications resistant to EMI (electromagnetic interference), for example under conditions experienced in high performance military aircraft.

Old methods of providing reliable communications include (1) using a high power (relative to expected interference) transmitter, (2) using filters to pass only those frequencies that are used in the particular instance, (3) using various modulation techniques to transfer the information via certain characteristic(s) of the transmitted signal (e.g. amplitude, frequency, phase), (4) using various codes to allow detecting and correcting errors that occur in the communication process. Generally, several of the above methods are used.

The principal disadvantage of the old methods is the inability to adapt to the specific interference that happens to be present as each portion of a message is transfered from its source to its destination. The old methods deal (at best) with the characteristics of the interference on a statistical basis, rather than with the characteristics of the specific interfering signal. This disadvantage is due to the following two limitations: (a) transfering information at a fixed rate (i.e. independent of the effects of interference on the current signal), and (b) transmitting the same signals each time the same message is sent (assuming the same initial state of the transmitter).

Transmissions of data among a plurality of avionics subsystems on the same aircraft have been subject to interruption by electromagnetic interference, even when transmission is by shielded wire.

SUMMARY OF THE INVENTION

With the foregoing in mind, it is a principal object of this invention to provide an improved digital data communication system suitable for use as a subsystem in an aircraft avionics system so as to render that system particularly resistant to electromagnetic interference or noise, and which is characterized as being capable of "baseband" implementation. That is to say, the message transmitting capability is dependent only upon combinations of simple presence or absence of a signal condition, for example, a positive, a negative voltage or near zero voltage between a pair of conductors. Alternative implementations can use passband signal representations of such baseband conditions.

Another important object of the invention is the provision of an interference resistant communications system suitable for the mentioned purpose which is not only reliable but relatively inexpensive to construct and maintain.

As another object, the invention aims to provide a communications system of the foregoing character that lends itself readily to implementation as a relatively secure transmission system.

Still another object is the provision of a highly interference resistant communications system that can utilize simple shielded wire pairs as the transmission medium even in the presence of severe electromagnetic conditions associated with radar transmissions or the like, and which system is self adaptive to the specific interference present at the times of transmission.

As yet another object the invention aims to accomplish the foregoing through the use of substantially identical master and slave transmit/receive stations connected by shielded wire pairs and taking advantage of varying EMI induced conditions in the wire pairs as indicative of a fault or interference condition.

Another object of the invention is to operate in the baseband mode rather than the passband mode. That is to say, the invention is neither frequency nor strictly time dependent, but rather relies on the transmission, receipt, and acknowledgement between the stations of simple logic level conditions.

The invention may be further said to reside in certain novel combinations and arrangements of parts, and in the cooperating relationships thereof, to provide a communication system that accomplishes the aforementioned objects and advantages, and in addition allows unusual flexibility in operation and accommodation of operating conditions.

Other objects and many of the attendant advantages will be readily appreciated as the subject invention becomes better understood by reference to the following detailed description, when considered in conjunction with the accompanying drawings.

DESCRIPTION OF THE PREFERRED EMBODIMENT

Figure 1:
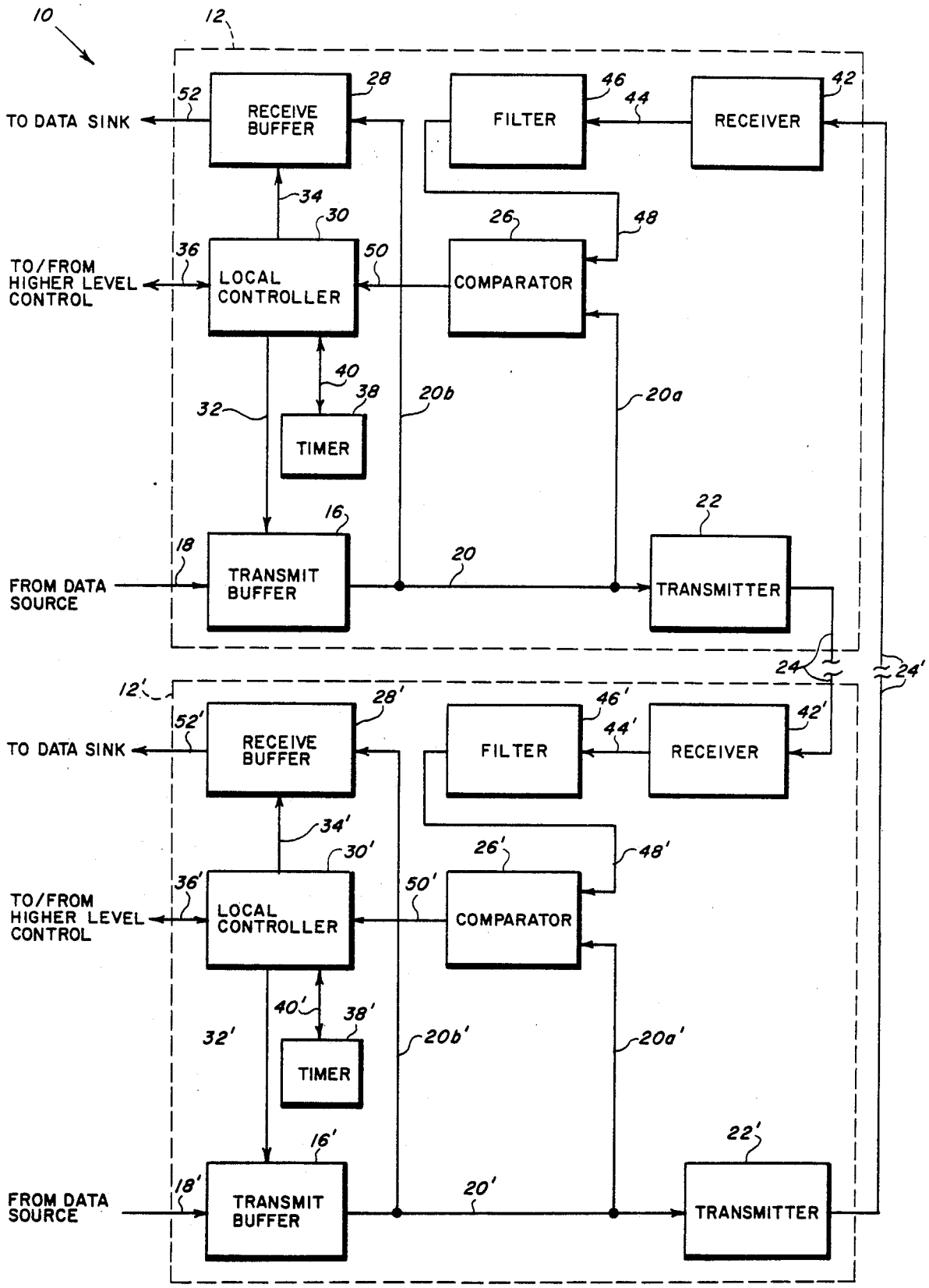
FIG. 1 is a diagrammatic illustration, in block form, of a communication system embodying the invention.

In the exemplary form of the invention illustrated in FIG. 1 and described hereinafter, a communication system is indicated generally at 10 and comprises two substantially identical transmitter/receiver units 12 and 12' which are in the relationship of master and slave, respectively. It will be understood that this relationship may, at times, be reversed for purposes which will later become apparent. Inasmuch as the units 12 and 12' are alike, the following basic description of the master unit 12 will, of course apply as well to slave unit 12', corresponding components of the later being identified by corresponding reference characters with prime marks added.

The unit 12 comprises a transmit buffer 16 adapted to receive and store binary data signals, as shown by flow line 18, from a data source (not shown) which is not part of the invention per se. The buffer 16 has its readout output, line 20, connected to the input of a baseband binary digital transmitter 22 for transmitting binary signals via a transmission medium such as a shielded twisted wire pair represented by flow line 24. The output 20 of buffer 16 is also connected, as shown by line **20*a*, as one input to a comparator 26, and by line 20*b* as an input to a receive buffer 28. The transmit and receive buffers 16 and 28 are controlled, in a manner later discussed more fully, by a local controller 30 via lines 32 and 34, respectively. Suffice it to say now that local controller 30 is adapted to receive instructions from or provide information to a higher level of system control as indicated by flow line 36. The local controller is further serviced by a clock means or timer 38 as shown by line 40**.

The unit 12 includes a receiver 42 interconnected with the transmitter 22' of unit 12' by a transmission medium 24' and has its output coupled via line 44, a filter 46, and line 48 as a second input to the comparator 26. The comparator 26 has its output connected as shown by line 50 to the local controller 30. The receive buffer 28 has its output connected via line 52 to a data utilization means, or data "sink."

The transmitters 22, 22', the receivers 42, 42', and the transmission media 24, 24' by this invention constitute a binary digital data link and the signals utilized thereby must include at least three distinct states. These three states will be referred to as "ONE," "ZERO," and "SPACE." The transmitter and receiver outputs may each have a state, referred to as "NOISE," that contains all conditions not specifically included in the ONE, ZERO, and SPACE states. A suitable binary digital data link is disclosed in copending patent application Ser. No. 614,197, U.S. Pat. No. 4,569,059 filed May 25, 1984, and assigned to the assignee hereof. Other known binary data transmitters and receivers having the mentioned capability of three distinct states may be used.

MODE OF OPERATION

Each unit 12, 12' has two modes of operation. In one mode a unit, e.g., unit 12 acts as an information source and in the other mode the unit acts as an information sink. The mode of each unit is controlled at the level providing commands to the invention.

Although operation of the level providing commands via lines 36, 36' to the invention is not part of the invention per se, it is helpful to see an exaple of how a higher level controller can use the invention.

The higher level controller is responsible for the following: (a) controlling whether a unit is in the source mode or the sink mode, (b) loading data into the transmit buffer, (c) unloading data from the receive buffer, (d) determining the maximum time allowed to transfer a message, (e) taking appropriate action in response to time out errors flagged by the invention, (f) issuing a transmit command to a unit when it is in the source mode and the contents of its transmit buffer should be transferred, (f) implementing any further levels of message protection desired (e.g. lateral and longitudinal parity bits, error correction coding, encryption and decryption of the data, etc.).

When power is first applied, the "master" unit 12 is placed in the source mode and the "slave" unit 12' is placed in the sink mode. The mode of each unit is changed at the completion of each attempt at transferring a message, regardless of whether or not a time out error was detected. The "master" unit is periodically forced to the source mode when it has been in the sink mode too long without receiving a message. The "slave" unit will remain in the source mode for only a limited amount of time before being forced back into the sink mode.

Figure 2:
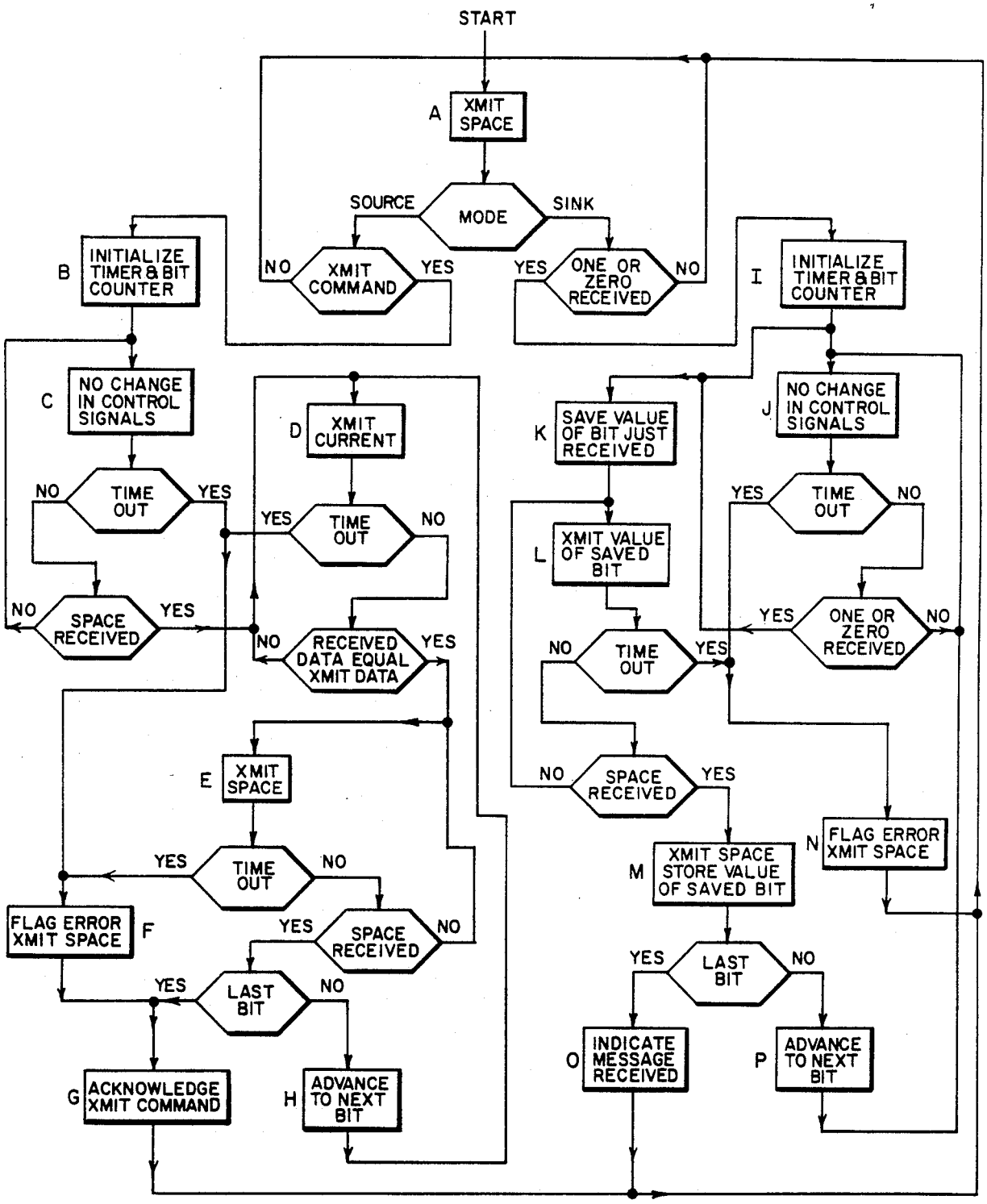
FIG. 2 is a flow chart diagrammatically illustrating operating states of the system of FIG. 1.

In the present instance, the invention is operated in the baseband to transfer fixed length binary messages between portions of a system that are physically remote from each other. Referring now to the state diagram of FIG. 2, the states of the controller 30 are refered to by capital letters in that diagram and the following discussion. Assuming that both transmitters are in the SPACE condition, which is forced during the initialization just after power is applied to the system (state A) the operation begins when a sequence of bits on line 18 representing the information to be transferred is placed in the transmit buffer 16 of the unit that is currently in the source mode (the "master" unit.) The source unit's controller 30 is commanded to transfer the information. The source unit's timer 38 is then set to limit the maximum amount of time available to the source unit's controller 30 to transfer the information (state B).

The following sequence of operations is repeated until either, all of the bits have been transferred (states G and O) or, a time out error is detected (state F or N): (a) the source unit's controller 30 waits until its filtered receiver output, line 48, is in a SPACE condition (state C), (b) the source unit's transmitter 22 is placed in a ONE or ZERO condition depending on the value of the bit currently being transferred (state D), (c) the sink unit's filtered receiver output, line 48', is saved temporarily (state K) and is transferred to its transmitter (state L) after the filtered receiver output goes to the ONE or ZERO condition (transition from state A to state I), (d) when the source unit's filtered receiver output, line 48, matches its transmitter input condition, line 20a, as determined by the comparison device 26, the source transmitter 22 is placed in the SPACE condition (state E), (e) when the sink unit's 12' filtered receiver output, line 48', goes to the SPACE condition, the value of the temporarily saved filtered receiver output (ONE or ZERO) is stored in the sink receive buffer 28' and its transmitter 22' is placed in the SPACE condition (state M).

When the entire message has been transferred within the time limit, the source unit acknowledges the transmit command (state G) and the sink unit indicates that a message has been received (state O). When the sink unit's filtered receiver output 48' first goes to a non-SPACE condition, its timer 38' is set to limit the total amount of time allowed for the sink unit's controller 30' to receive a message (state I). If the entire message is not received within the allowed time, the sink unit's controller 30' indicates an error has occurred (state N) and goes to state A, from which higher level mode commands are initiated.

In the present implementation, a fixed sequence of bits is appended to the beginning of each message for use in "synchronizing" the two units. Two separate time limits are used in order to transfer an entire message. The first time limit pertains to this fixed sequence of bits at the beginning of each message. The second time limit pertains to the rest of the message. The purpose of the fixed sequence of bits at the beginning of a message is to help the unit in the sink mode to distinguish real messages from interference that drives the filtered receiver output to a ONE or a ZERO condition.

The principal advantage of the invention is the ability to vary the signals used for communication, in response to the specific interference that happens to be present as each part of the message is transferred. In addition to providing immunity to externally generated interference, the invention also provides immunity to interference generated by the system of which it is a part. This allows, for example, the hardware used for transmission and reception to be interrupted to perform a time critical function without losing any bits in the message being transferred, or invalidating the transmission (assuming the total time used to service the interruption(s) does not cause the total time allowed for the message transfer to be exceeded.) A second type of interference that might be generated by the system using the invention is placing the transmitter output into the NOISE state. This could be done in order to increase the security of the communication link with respect to an eavesdropper who does not know what the valid ONE, ZERO, and SPACE conditions are.

It should be noted that an important new feature of the invention is the inclusion of the information source, the information sink, and the transmission medium connecting them in a loop that is closed at the level of the smallest signaling unit in the baseband. This results in a variable amount of time being used to transfer each bit of the message. Thus each message may be represented by an arbitrarily large number of waveforms.

The current implementation takes as the value of the bit being transferred, the first ONE or ZERO condition of the filtered receiver output following a SPACE. An alternative is to take as the value of the bit being transferred, the last ONE or ZERO condition of the filtered receiver output preceding a SPACE. Many coding schemes can be used in lieu of either the first or last ONE or ZERO condition between SPACE conditions.

Another alternative to the current implementation is operation in the passband rather than the baseband. In order to operate in the passband, a signal set must be chosen and the passband characteristics of the hardware must be such that the baseband signal may be varied as described above in order to close the loop at the level of the smallest signaling unit in the baseband. Many methods of representing baseband signals by passband signals can be used. Several examples follow. The simplest example involves trasmitting on only one of three discrete frequencies while in the source mode and on only one of three other discrete frequencies while in the sink mode. In this case each state of the baseband "transmitter" is represented by the constant amplitude transmission of a specific frequency in the passband. A more useful example expands the total number of frequencies used while still constraining each transmitter to transmit on only one frequency at a time. In this case, the set of all frequencies is partitioned into (at least) six different subsets. Three of these subsets are used to represent the ONE, ZERO, and SPACE conditions of a baseband "transmitter" in the source mode and three different subsets are used to represent the same baseband conditions in the sink mode. In this example, the source mode units' controller can hop among the passband frequencies in the subset corresponding to the baseband signaling unit currently being transmitted (i.e. ONE, ZERO, or SPACE) an arbitrary number of times for the duration of the current baseband signaling unit.

Allowing the passband transmitter to transmit on more than one frequency at any given time opens up many more possibilities. Consider the case where each baseband signaling unit is represented by a particular combination of passband frequencies transmitted simultaneously. Unlike the two previous examples, this would allow independent control over message content and the amount of energy transmitted at a specific frequency, or a specific set of frequencies. When used in a secure communications link, the current combination could be changed often enough to provide a high degree of security. A portion of the variability in passband representations of a baseband signal allowed by the closed loop nature of the invention can be used to increase the security of the communication link. For example, when all possible passband frequencies are not used to represent baseband signaling units, some of the otherwise unused passband frequencies can be used to transmit "noise" in order to hamper unauthorized reception. As a second example of noise transmission, consider a system in which the baseband signaling units are represented by certain combinations of passband frequencies transmitted simultaneously. In this case, both the duration and amplitude of each passband frequency pulse can be used to transmit noise or a decoy message in order to misdirect an unauthorized receiver.

So far the discussion has concerned one unit in the source mode and one unit in the sink mode in a closed loop configuration. In order to broadcase the same message to multiple receivers "simultaneously," (as might be done in a "data bus" application or in the situation where a number of pilots flying together need to communicate with each other) a unit in the source mode could close a separate communication loop with each receiver to which the message was to be broadcast at a rate consistant with the desired degree of sychronization among the receivers. Closing the loop with each receiver requires that the unit in the source mode be able to tell the transmissions of each receiver apart.

In addition to representing the information to be transferred via the frequency characteristics of the passband signal, other characteristics of the passband signal that could be used for this purpose (alone or in combination) include: amplitude, duration, and phase.

Obviously, other embodiments and modifications of the subject invention will readily come to the mind of one skilled in the art having the benefit of the teachings presented in the foregoing description and the drawing. It is, therefore, to be understood that this invention is not to be limited thereto and that said modifications and embodiments are intended to be included within the scope of the appended claims.

What is claimed is:

1. Apparatus for interference resistant communication between a data source and a data sink of binary digital data messages where a message is made up of a train of discrete message elements where each message element consists of a binary one, or a binary zero, or a space, said apparatus comprising:

a first station and a second station interconnected by a transmission medium, said stations being in the relation of data source and data sink, each of said stations comprising transmitter means for transmitting first, second, and third signal states which are assigned to represent message elements including binary ones, binary zeros, and spaces therebetween, transmit buffer means for holding data to be transmitted, receiver means for receiving message elements transmitted by the other sation, timer means for limiting the amount of time that will be used in attempting to transfer a message, comparator means for comparing transmitted and received message elements, filter means for enhancing those characteristics of the received signal which are not used for communication to which the receiver is sensitive, receive buffer means for holding message elements received and compared, and local controller means responsive to said timer means and to said comparator means to effect transfer of positively compared elements to said receive buffer and succeeding elements from said transmit buffer to said transmitter means;

said first and second stations being operative in response to said timer means to reverse roles as data source and data sink when a predetermined time period is exceeded without completion of a message transfer.

2. Apparatus as defined in claim 1, and wherein:

said transmission medium comprises conductor means defining a first transmission path between said transmitter means of said first station and said receiver means of said second station, and a second transmission path between said transmitter means of said second station and said receiver means of said first station, whereby said first and second stations and said transmission medium comprise a closed loop communication system.

* * * * *